United States Patent [19]

Mail

[11] 3,919,081
[45] Nov. 11, 1975

[54] SEPARATION OF EMULSIFIED LIQUIDS
[75] Inventor: Issac P. Mail, Tulsa, Okla.
[73] Assignee: Combustion Engineering, Inc., New York, N.Y.
[22] Filed: Sept. 1, 1972
[21] Appl. No.: 285,713

Related U.S. Application Data
[63] Continuation of Ser. No. 87,526, Nov. 6, 1970, abandoned.

[52] U.S. Cl. .............. 210/23; 210/40; 210/83; 252/331
[51] Int. Cl.² .................................... B01D 17/04
[58] Field of Search .............. 210/23, 30, 39–41, 210/83, 265, 502, DIG. 5, DIG. 21; 252/322–325, 328–331; 55/45

[56] References Cited
UNITED STATES PATENTS

| | | | |
|---|---|---|---|
| 1,539,775 | 5/1925 | Sauer | 252/324 X |
| 1,987,870 | 1/1935 | Robinson | 252/322 |
| 3,242,097 | 3/1966 | Crawford | 252/325 |
| 3,268,456 | 8/1966 | Fruth | 252/324 |
| 3,414,523 | 12/1968 | Jockel | 210/39 X |
| 3,436,344 | 4/1969 | Canning et al. | 210/39 |
| 3,457,169 | 7/1969 | Schneider | 210/23 |
| 3,558,482 | 1/1971 | De Young | 210/23 |
| 3,651,944 | 3/1972 | Shuttleworth | 210/265 |
| 3,687,844 | 8/1972 | Grob et al. | 210/83 X |
| 3,720,626 | 3/1973 | Benzaria et al. | 210/30 X |

Primary Examiner—Thomas G. Wyse
Attorney, Agent, or Firm—Arthur L. Wade

[57] ABSTRACT

A tank, or vessel, has a bed of preferentially wettable material in particulate form mounted in it to receive a mixture of liquids to be separated passing downwardly through the bed.

5 Claims, 2 Drawing Figures

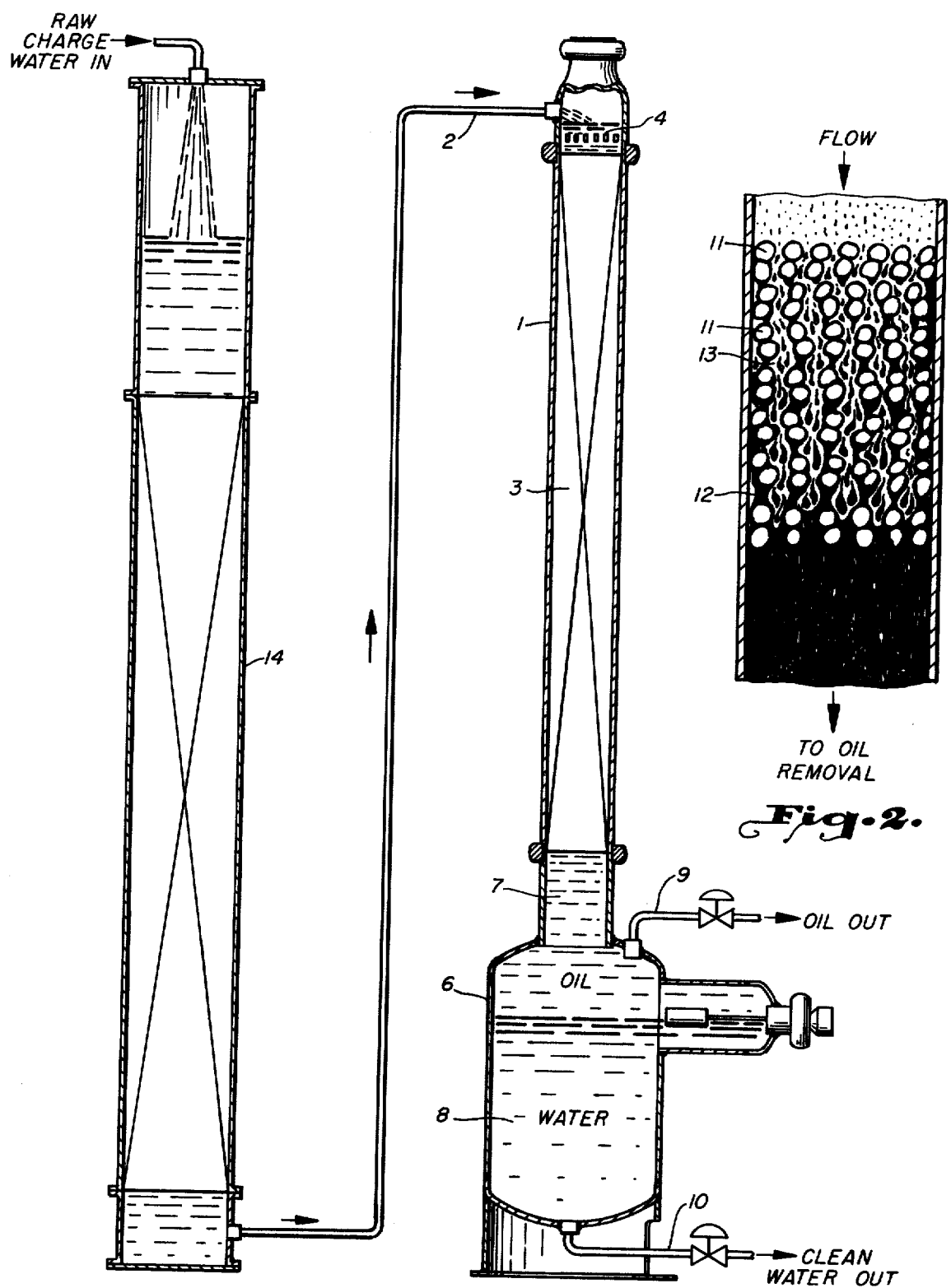

SEPARATION OF EMULSIFIED LIQUIDS

This application is a continuation of Ser. No. 87,526, filed Nov. 6, 1970, now abandoned.

BACKGROUND OF THE INVENTION

1. Field of the Invention

The present invention relates to the separation of liquids which are inherently immiscible wherein one of the liquids is dispersed in the remaining liquids. More particularly, the invention relates to the use of a surface phenomena of solid media in granular form to break the bond of the dispersed liquid and the remaining liquid and thereby promote the agglomeration of the dispersed liquid into a separate collection for removal.

2. Description of the Prior Art

The problem of agglomerating one of two or more immiscible liquids, the one being finely dispersed in the remaining liquids, has been carried out by employing the surface of media of various types. The emulsions of liquids have been impinged upon the large surfaces of bodies of media wettable with the dispersed liquid. When impinged, the dispersed liquid mechanically adheres to the media surface, collects, forms relatively large drops and then gravitates into a collection of the agglomerated liquid for mechanical removal, or separation, from the remaining liquids.

The mechanical effect of impinging dispersed liquid on a media surface to transfer the surface energy of the dispersed liquid to the media surface is relatively weak. The surface energy of the liquid can, alternately or in parallel, be reduced by the use of various chemical compounds. However, the use of both surface and chemicals to obtain the desired result is both expensive and cumbersome. There is need for a media to be used so dispersed liquid will be agglomerated from its relation with other liquids to readily separate from the other liquids without the support of expensive chemicals.

SUMMARY OF THE INVENTION

A principal object of the invention is to apply only the surface properties of a media to break the bond between a selected liquid dispersed in other liquids and agglomerate the dispersed liquid.

Another object is to collect the agglomerated liquid for separation from the other liquids.

The present invention contemplates establishing a body of media which is preferentially wetted with a liquid which is finely dispersed in other liquid. The liquid mixture is passed through the body of media and the finely dispersed of the liquids impinged on the media surface where it clings and forms pipes, or passages, of the dispersed liquid within which the finely dispersed liquid forms drops large enough to readily collect as a removable body.

The invention further contemplates a body of media mounted in a container, or vessel, and the container providing sufficient capacity below the body for the lighter, agglomerated liquid to form a body above the remaining liquids.

The invention more specifically contemplates an media wettable by insoluble liquid hydrocarbons in the form of activated carbon from which the alkaline ash is removed with acid. This media is then placed in contact with an emulsion of the insoluble hydrocarbons and water and is saturated by the insoluble hydrocarbons, forming pipes, or passages, in which the insoluble hydrocarbon forms droplets large enough to readily coalesce into a body of hydrocarbons which can be separated from the water.

Other objects, advantages and features of this invention will become apparent to one skilled in the art upon consideration of the written specification, appended claims, and attached drawing, wherein;

FIG. 1 discloses a somewhat diagrammatic, sectioned elevation of a system of tanks, or vessels, one of which contains preferentially wettable media, in which the present invention is embodied; and FIG. 2 is a diagrammatic illustration of my concept of a saturated bed of media.

DESCRIPTION OF THE PREFERRED EMBODIMENT

In FIG. 1, a container, or tank, 1 is illustrated as connected to a conduit 2. Conduit 2 brings to the container a mixture of water and insoluble liquid hydrocarbons, the water being the dominant phase. This hydrocarbons-in-water emulsion is brought to the system for separation, removal of the hydrocarbons from the water.

Under the circumstance of the hydrocarbons being the subordinate phase of the mixture, or emulsion, hydrocarbon is a contaminant. As a polluting medium, it is desired to remove this hydrocarbon from the water so the water may be disposed of, or used again. In all events, the system disclosed is designed to alleviate pollution of water bodies by hydrocarbons.

Installed in tank 1 is a bed of media 3. A distributor 4 is mounted above the upper surface of bed 3. As the liquid mixture is flowed downward, it is flowed through distributor 4 and then bed 3. If the distributor functions as desired, it will cause horizontal distribution over the cross-section of the bed. Thus, the volume of the bed will be exposed to the liquid mixture so the surface of the media will be fully effective in contacting the mixture flowing through it.

The lower portion of tank 1 is a chamber 6 in which the hydrocarbons and water collect as they fall from bed 3. The hydrocarbons, agglomerated by the bed, collects in a body 7 above the heavier body 8 of water which has also passed through the bed. These collections are separately removed. Conduit 9 is valved to control the removal of the hydrocarbons. Conduit 10 is valved to control the removal of the water.

The key to the success of the system of separation rests squarely on the function of the bed 3 material. Empirical data presently appears to favor use of a specific material for this media. However, there appear to be common denominators of characteristics of various material for this purpose. I am not certain of all the common characteristics desirable, but it does appear desirable for the media to be treated so as to remove all foreign matter from the surface of the individual particles of the media. The resulting uniformity of the surface apparently fosters the desired function.

Activated carbon is the apparently favored specific material. Activated carbon is a preferentially hydrocarbon-wetted material and is highly surface active due to the tremendous internal surface area created by the activating process. The mechanism which produces the results obtained with a bed of activated carbon is not actually known at this time. I have advanced various theories, but am not presently certain of my ground. Further, I have concluded that a cleaning of the activated carbon with an acid solution increases the efficiency of the material for this present purpose.

I do not mean to imply, by my honesty with respect to my knowledge and theory, that my invention is indefinite, or a minor advance in the art. The dynamics of my system may not lend themselves readily to my intellectual analysis, but I am clear on what steps to take to achieve the objectives of my invention. My disclosure is clear and definite and my claims define what I firmly believe to be my invention.

To continue, with a bed of media properly cleaned and positioned in its tank, the hydrocarbon-contaminated water is passed downward through the bed until the media is saturated with the hydrocarbon. Apparently the hydrocarbons become tightly bonded to the media surface. To a finely divided hydrocarbon particle in its water vehicle, I believe the hydrocarbon covered media particle gives the appearance of a large hydrocarbon particle with a relatively small passage around the particle and adjacent particles. The result is a very torturous path through the bed for the finely divided hydrocarbon particles. I have described these paths as minute pipelines with walls of hydrocarbons which have a very low friction compared to a common piping system.

FIG. 2 gives my version of how the hydrocarbons appears on the bed particles. Bed particles 11 are saturated, coated, by hydrocarbon 12. Passages 13 are formed around the resulting hydrocarbon particles.

Within my pipelines 13 of hydrocarbons, the finely divided hydrocarbons in its water vehicle has its chances of collision with other finely divided hydrocarbon particles increased tremendously by the many changes in direction of the path. Also, the collision of the finely divided hydrocarbon particles with the walls of its pipeline is intensified. Collision results in coalescence of the hydrocarbon particles, with other particles and/or the hydrocarbon walls of its pipeline. In either event, or other event, a high degree of coalescence has obviously taken place by the end of travel through the bed. Large drops of hydrocarbons fall from the bed and readily collect below it, on top of its water vehicle.

This saturation of such a bed of media is the trick. It could be said that a bed of proper material forms a framework for the hydrocarbon piping system. Once such a system is established by saturation of the bed with hydrocarbons, the coalescence desired takes place.

The fluids flowing down through the bed have two forces applied to them. The gravity head as measured by the bed depth is one force. The difference in pressures from dynamic forces is the other. Obviously, this latter pressure differential will increase if foreign solid matter enters the bed. In general, the oil field refers to foreign solid matter as "sand." If sand is carried along with the hydrocarbon contaminated water, there is a danger that the bed will plug with this material and become less efficient, eventually becoming inoperative.

Several systems are available to reduce and eliminate sand in hydrocarbon-contaminated water prior to its treatment in the bed of the invention. Settling basins and centrifuges are well known and available. I have represented any such device upstream of the container 1 as embodied in a tank 14.

Tank 14 may contain a filter 15 designed to remove the undesirable solids and be backwashed to keep it operative. Whatever sand-removing device tank 14 represents, it is upstream of the bed 3 to protect the bed as a coalescing device.

I appreciate the present invention is associated with structure not appearing to be unique in form. However, as simple as my approach has been, I have solved a long standing problem of pollution. It can be said that the hydrocarbon-wettable properties of certain materials has long been known. It has certainly been known that activated carbon falls into this classification. Beds of this type of material have been used to treat fluid streams by passing the fluid streams through the beds.

However, no one, to my knowledge, has attacked the separation problem presented by finely dispersed insoluble liquid hydrocarbons through water with my process. I have formed the bed of hydrocarbon-wettable particles and cleaned the surface of these particles thoroughly. In the case of activated carbon, I have washed the alkaline ash from the carbon with an acid solution. The hydrocarbon-contaminated water has then been passed down through this bed until the bed particles are thoroughly coated with the hydrocarbons. Agglomeration of subsequent hydrocarbons then takes place within this bed with surprising efficiency.

As I have said, I am uncertain of the exact nature of this phenomenon. However, it is a real contribution to the art of anti-pollution. The industry has been impressed with the performance of my several pilot models using this process. When solid contaminants can be reduced to the level where the bed will not plug, the application yields readily to my solution of the problem.

From the foregoing it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A process for separating insoluble liquid hydrocarbon and water which are bound together in an emulsion in which the dominant phase is the water, including,
    forming a bed of activated carbon,
    washing alkaline ash from the activated carbon with acid,
    saturating the bed with insoluble liquid hydrocarbons to form passages through the bed with insoluble liquid hydrocarbons as their walls,
    passing the emulsion through the bed to agglomerate the insoluble liquid hydrocarbon in the mixture,
    and collecting and discharging the insoluble liquid hydrocarbon and water separately.

2. The process of claim 1, including,
    reducing the amount of solid material suspended in the emulsion at some point upstream of the bed.

3. A process for separating insoluble liquid hydrocarbons and water which are normally immiscible and wherein the liquid hydrocarbons are a relatively small volume percentage of the mixture and is dispersed in relatively fine particles within the water, including, forming a bed of particles of activated carbon having all foreign matter removed from the surface thereof and being preferentially wetted by the insoluble liquid hydrocarbons, saturating the bed with the dispersed liquid hydrocarbons until all surfaces of the bed particles are wetted with the dispersed liquid hydrocarbons, passing the mixture of the two liquids through the bed to agglomerate the insoluble liquid hydrocarbons, and collecting and discharging the liquids separately.

4. The process of claim 3 in which the bed of particles of activated carbon have all the foreign matter removed from the surface thereof by washing the bed in situ subsequent to forming the bed of particles.

5. The process of claim 4, including, reducing the amount of solid material suspended in the emulsion at some point upstream of the bed.

* * * * *